July 24, 1934.  A. L. BARNES  1,967,547
DRIVING MECHANISM
Filed Dec. 6, 1933  4 Sheets-Sheet 1
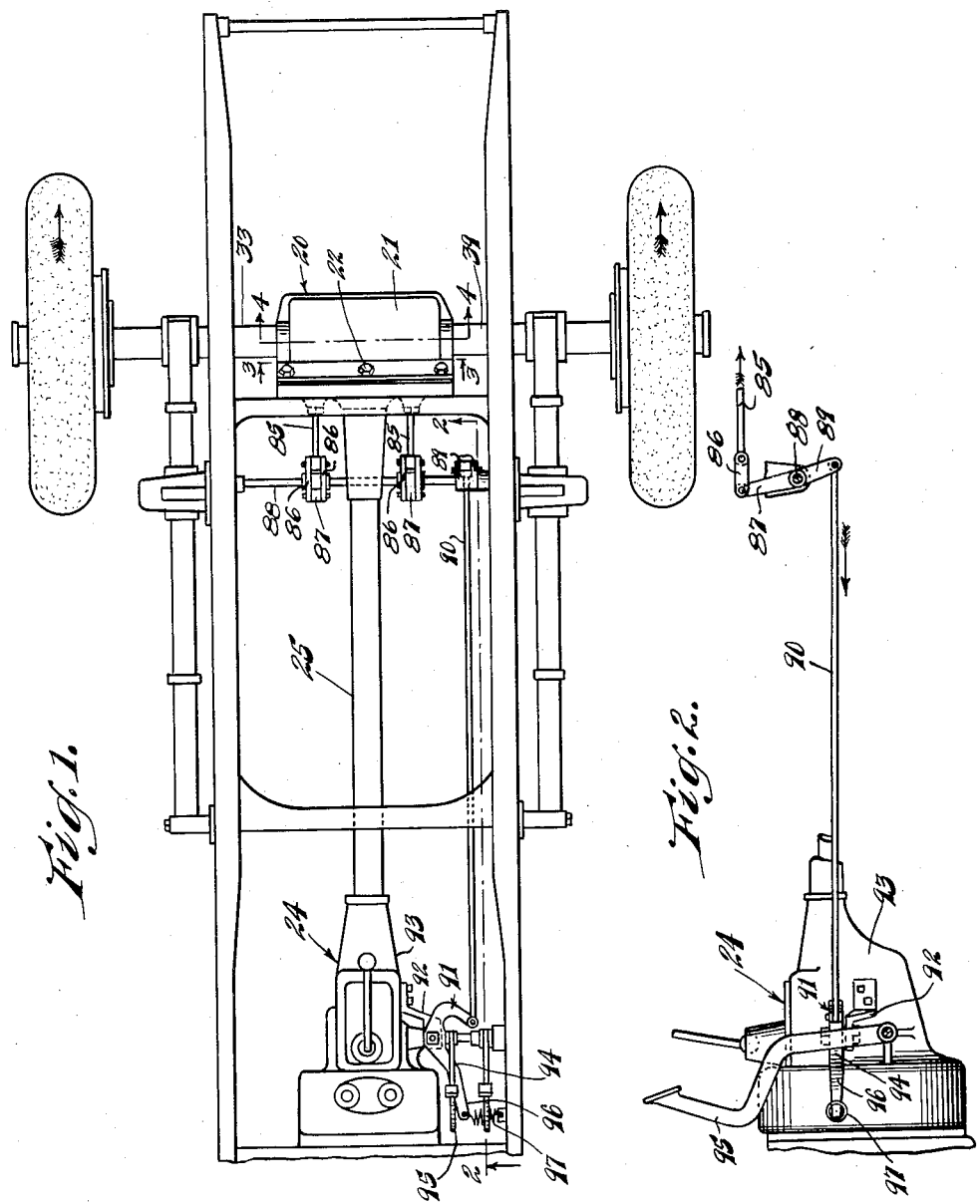
Witnesses:
C. E. Wessels
Anita E. Matson
Inventor:
Allen L. Barnes,
By Joshua R. H. Potts
his Attorney.

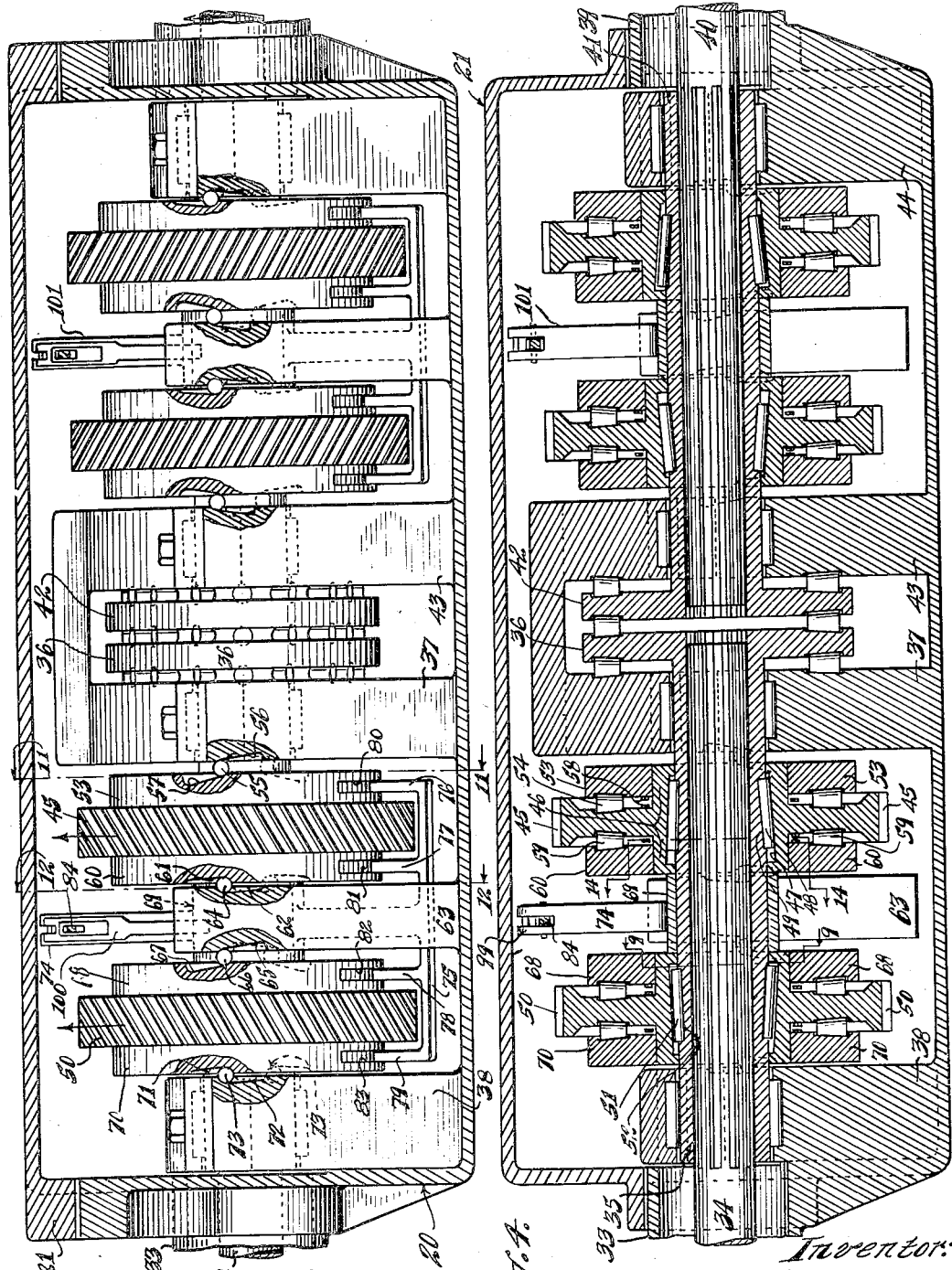

July 24, 1934.  A. L. BARNES  1,967,547
DRIVING MECHANISM
Filed Dec. 6, 1933  4 Sheets-Sheet 3
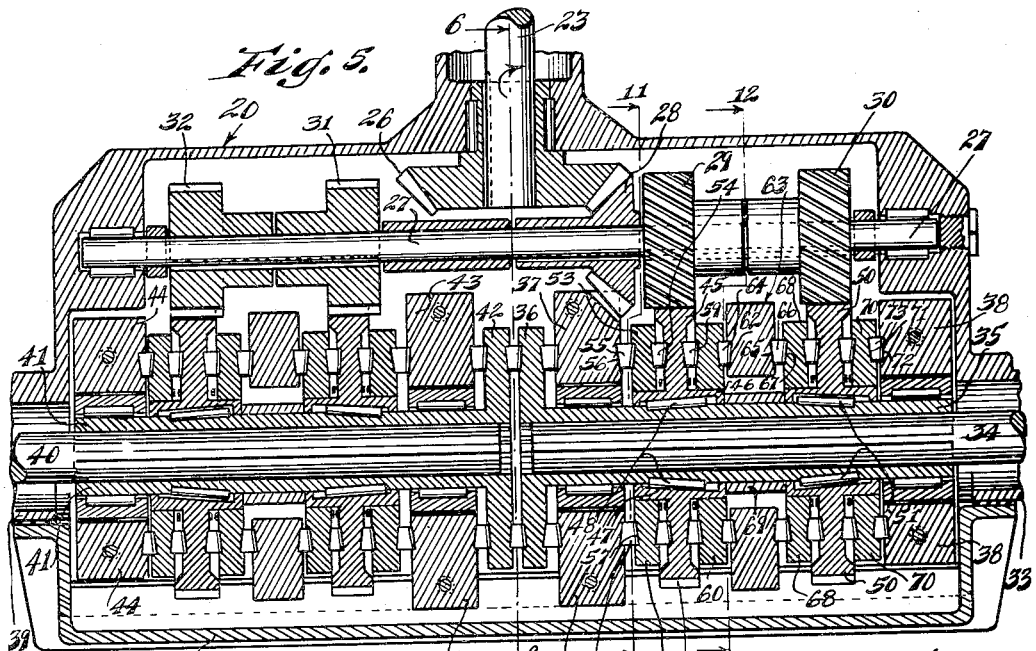
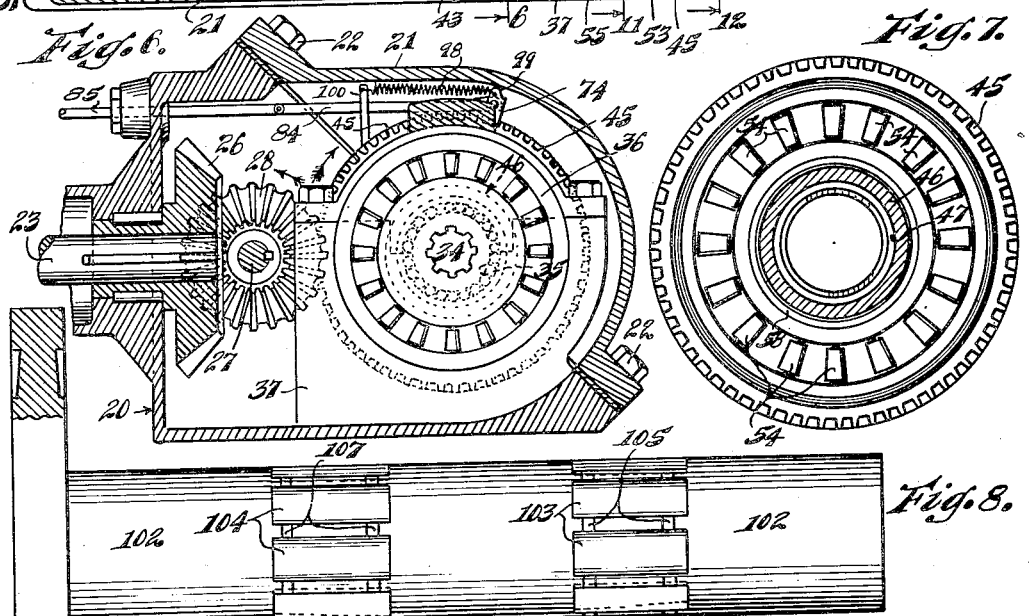
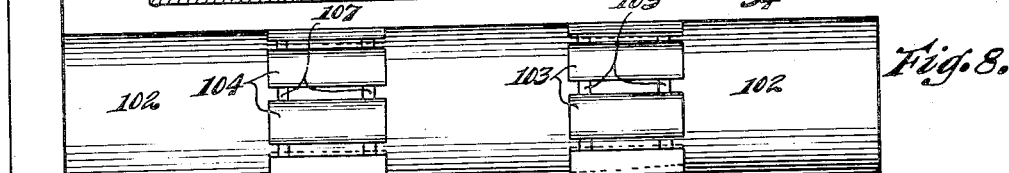
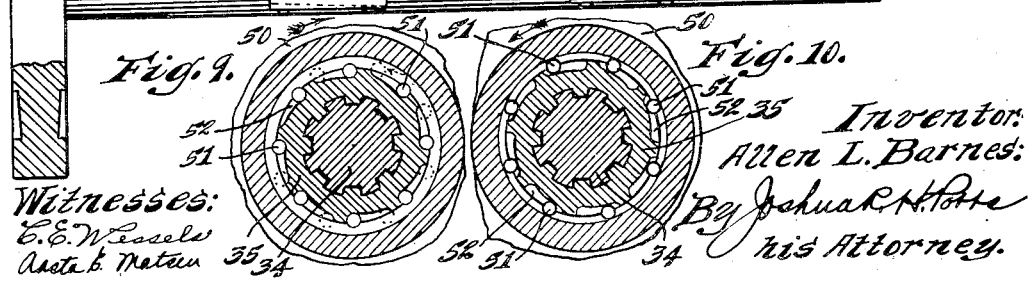
Inventor:
Allen L. Barnes:
By Joshua R. H. Potts
his Attorney.
Witnesses:
C. E. Wessels
Aaeta B. Mateau

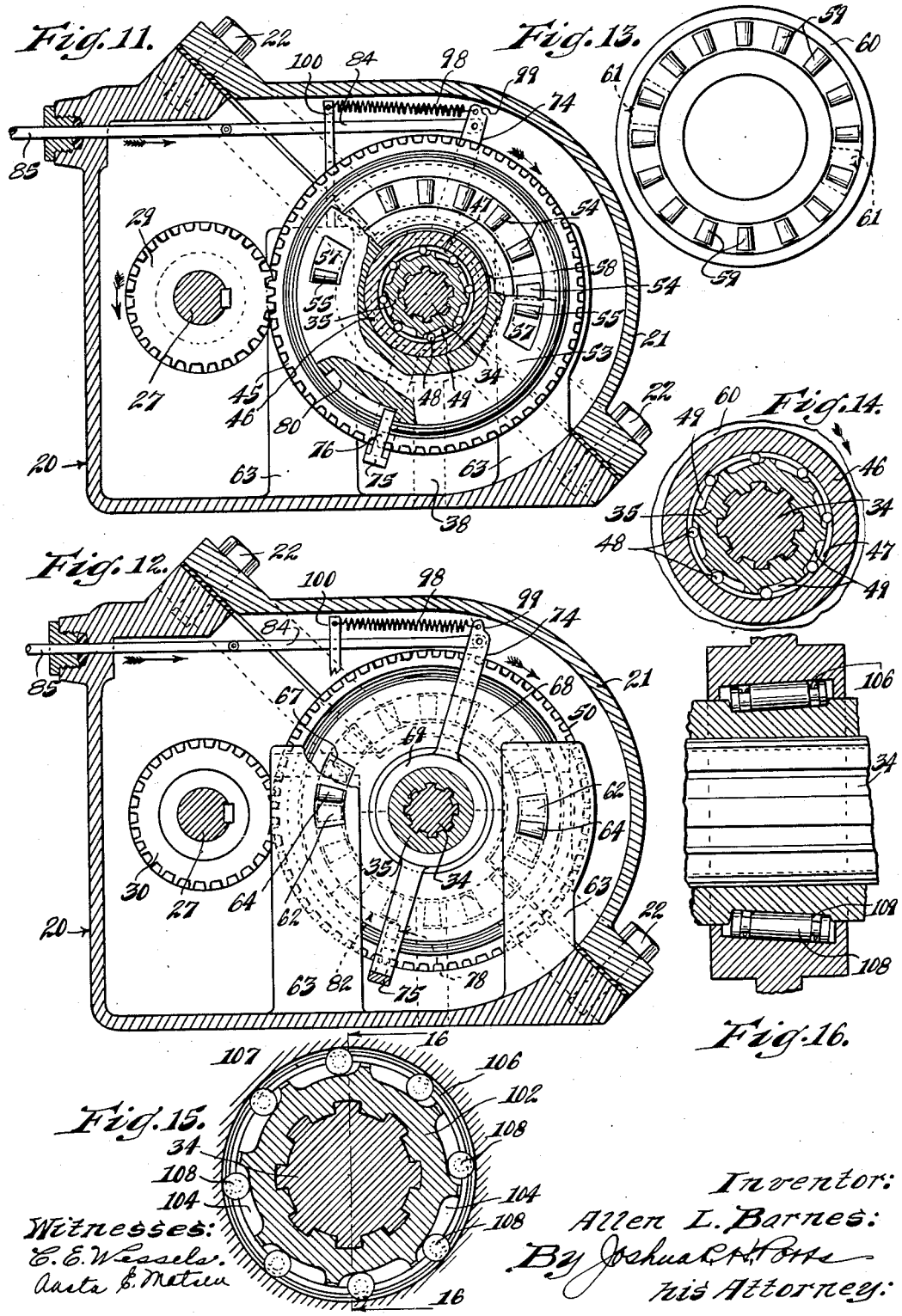

Patented July 24, 1934

1,967,547

UNITED STATES PATENT OFFICE 1,967,547

DRIVING MECHANISM

Allen L. Barnes, Oak Park, Ill., assignor, by direct and mesne assignments, to Joseph H. Hinshaw, trustee, Wilmette, Ill.

Application December 6, 1933, Serial No. 701,111

23 Claims. (Cl. 74—389)

My invention relates to new and useful improvements in the method and apparatus for the distribution of power from a common power drive shaft to one or more secondary power transmitting shafts by means of gears and other mechanism in such manner as to permit of a more useful application of the power by distributing it to such secondary power transmitting shafts, proportional to the required and useful consumption of power, and in such manner that undesirable reactions cannot be transmitted from the secondary power transmitting shafts back to the common power drive shaft.

The above method and apparatus permit of the transmission of power with various advantages, a few of which are: differentiating, free wheeling, reverse drive, engine braking, positive drive, power transmission directly proportional to the relative ability of consumption, constant mesh gears, automatic shifting, and manually controllable engine braking.

My invention is particularly applicable to automotive transmission of power and I prefer to explain my construction and operation in connection with the wheel driving mechanism of an automobile, commonly known as the differential.

It is well known that the automobile has driving wheels mounted in spaced relation to each other and mounted and constructed so that they may operate at different speeds in relation to each other. This is made necessary by the fact that what is commonly known as the outside wheel must travel a greater distance than the inside wheel when the vehicle is being turned from a rectilinear path of travel.

The differential mechanism which has heretofore been used has undergone very little change since its inception but has long been known to possess many objectionable features.

One of the more prominent objectionable features in the present differential has been due to the difficulty encountered when the traction ability of one of the drive wheels becomes less than the other. This is particularly noticeable when one of the drive wheels is prevented from making frictional contact with the road bed due to the intervention of mud, ice, snow or other frictionless material such as is often encountered when one of the drive wheels is down in the gutter. In this case the upper wheel may have considerable traction ability while the other may have none. In such case the present type differential permits the power to be transmitted to the drive wheel having no traction ability causing it to rotate free of the road bed while the drive wheel offering better traction stands still, resulting in the stalling of the car. My invention overcomes this objectionable feature by transmitting the power directly proportional to the tractional ability of the drive wheels and thereby prevents stalling.

A further objectional feature found in the differentials now being employed becomes apparent while driving at a high rate of speed over apparently level road bed which is in reality more or less wavy and causes a heaving of the drive wheels with a resultant fluctuation of tractional ability between the wheels. This is more pronounced at lower speeds over rough roads. This fluctuation of traction ability causes a variation in the transmission of power to the drive wheels permitting the greater amount of power to flow to the drive wheel having less tractional ability and which may at times be clear of the road bed, in which case, the wheel will lunge ahead permitting the engine to lurch ahead without load, only to be suddenly checked when the drive wheel again secures a more firm grip on the road bed. This is not only a strain on the engine but a strain on the entire car and is also uncomfortable for the occupants of the car. The result is a waste of driving energy and therefore a waste of gasoline. My invention overcomes this difficulty due to the fact that I have provided a direct drive to both of the drive wheels with a balanced distribution of power.

My invention provides a further advantage over the present type differential in that it supplies free wheeling which eliminates the necessity of installing a free wheeling unit in the transmission with a consequential reduction in cost to the producer as well as providing a more logical and natural control of same. Free wheeling as generally employed in the present automobile is cut out or in manually. I find that in order to brake with the engine it is necessary to cut out the free wheeling and in the present free wheeling unit as generally employed it is necessary to transmit power to the rear wheels while cutting out the free wheeling. This is not only hazardous on mountainous roads but necessitates using the wheel brakes while manipulating the free wheeling and thereby defeating the object of cutting the free wheeling out, which object is to brake with the engine. The advantage of free wheeling as employed in my invention is the fact that engine braking can be applied in short notice without using wheel brakes and without transmitting power to the wheels at the time, and without the operation of a control on the transmission but by simply pressing in slightly on the brake pedal which is the natural thing to do at any time braking becomes necessary. If the engine does not brake enough then further depression of brake pedal applies the wheel brakes. In bringing a car to a stop it is desirable to first brake with the engine and follow with wheel brakes which is accomplished in this invention without the employment of an additional control other than is now being employed.

A further objection to the present type differential is the fact that in most cars at present the clearance of the differential is the factor that determines the road bed clearance because of the extreme diameter required to house the concentrically spaced gears. The considerable reduction in the diameter of the differential housing as illustrated in this invention will permit of greater clearance and a possible lowering of axle and consequently lower the center of gravity of the car to a very desirable advantage.

A further desirable feature attained in my invention is the fact that the reverse and low ahead need not be the same ratio. In the present differential this is impossible. In my invention the reverse drive gears being distinct and separate from the forward drive gears can be of different ratio and preferably of lower ratio which in case of braking with the engine automatically becomes a higher ratio because the power is being transmitted from the secondary transmitting shafts to the power drive shaft instead of vice versa in the case of the engine pulling. This produces a higher speed of revolution of the engine while engine braking and thereby more efficiency.

Other objects are the provision of mechanism which is simple in construction, durable, and positive in operation, and other objects will appear hereinafter.

My invention may be understood thoroughly by reference to the following specification and drawings in which:

Fig. 1 is a partial plan view of the chassis of an automobile having my invention applied thereto;

Fig. 2 is a sectional view taken substantially on the line 2—2 of Fig. 1;

Fig. 3 is a sectional view taken substantially on the line 3—3 of Fig. 1;

Fig. 4 is a sectional view taken substantially on the line 4—4 of Fig. 1;

Fig. 5 is a plan section taken substantially on the axis of the axle shaft of the driving mechanism;

Fig. 6 is a sectional view taken substantially on the line 6—6 of Fig. 5;

Fig. 7 is a side elevational detail view of one of the axle driving gears employed in my invention;

Fig. 8 is a detail view of a modified form of axle shaft which may be employed in my invention;

Fig. 9 is a sectional view taken substantially on the line 9—9 of Fig. 4;

Fig. 10 is a sectional view taken substantially on the line 9—9 of Fig. 4 with the parts shown in a different stage of operation;

Fig. 11 is a sectional view taken substantially on the line 11—11 of Fig. 5;

Fig. 12 is a sectional view taken substantially on the line 12—12 of Fig. 5;

Fig. 13 is a detail view of one of the roller bearing thrust rings employed;

Fig. 14 is a sectional view taken substantially on the line 14—14 of Fig. 4;

Fig. 15 is a sectional view similar to Fig. 14 and shows a modified form of construction; and Fig. 16 is a sectional view taken substantially on the line 16—16 of Fig. 15.

For purposes of illustration all the parts of the driving mechanism are shown in the positions and relations to each other which they occupy while the vehicle is being driven in a reverse direction; when the parts are in different positions or relations they will be so specified.

Referring now to Fig. 1 my driving mechanism is incased in a housing 20 having a removable cap 21 arranged at an angle of substantially 45 degrees as can be seen clearly in Fig. 11 and anchored to housing 20 by screw bolts 22. A drive shaft 23, shown in Figs. 5 and 6, is operatively connected with a transmission 24 and incased in a torque 25. The drive shaft 23 extends through the front wall of housing 20 and is keyed to a bevel gear 26 which is supported in a roller bearing by the front wall of housing 20.

Referring now to Fig. 5 a counter shaft 27 is arranged transversely of drive shaft 23 within housing 20 and arranged in roller bearings supported by said housing. Toward the center of said counter shaft is keyed a bevel gear 28 which meshes with and is driven by bevel gear 26. To the right of gear 28 as shown in Fig. 5 are arranged a helical reverse drive gear 29 and a helical forward drive gear 30 and both are keyed to shaft 27. To the left of bevel gear 28 a helical reverse drive gear 31 and a helical forward drive gear 32 are keyed on shaft 27. Appropriate spacing collars keep the various gears on shaft 27 in proper positions.

From the right side of housing 20 as shown in Fig. 5 a tubular axle housing 33 protrudes and receives an axle shaft 34 which is arranged parallel to counter shaft 27. Axle 34 is splined and extends inwardly through a splined sleeve 35. Sleeve 35 extends substantially halfway across housing 20 and carries an integral thrust flange 36 on its inner end. The sleeve 35 adjacent its inner end is carried in roller bearings which are supported by a stationary member or vertical web 37. Adjacent its outer end it is carried in roller bearings which are supported by a stationary member or vertical web 38.

Axle housing 39 protrudes from the left side of housing 20 as shown in Fig. 5 and receives an axle shaft 40 whose inner end is splined and slidably received within a splined drive sleeve 41. The drive sleeve 41 is provided with an integral thrust flange 42 at its inner end and its inner face bears against a roller thrust bearing which is interposed between flange 42 and flange 36. The outer faces of thrust flanges 36 and 42 bear against thrust roller bearings which are interposed between said flanges and stationary members or vertical webs 37 and 43 respectively. Sleeve 41 adjacent its inner end is carried in a roller bearing which is supported by a stationary member or vertical web 43 and adjacent its outer end in a roller bearing supported by a stationary member or vertical web 44.

For cooperation with gear 29 (Fig. 5) I have provided a helical gear 45 which has an enlarged hub 46 having an internal annular groove 47 therein. The hub 46 is rotatably carried on driving sleeve 35, and locking rollers 48 are carried by sleeve 35, interposed between the bottom of groove 47 and sleeve 35, and seats in groove 47. The relation of the sleeve and locking rollers just mentioned are shown particularly in Fig. 14, and the various parts are in such relation that the driving unit may cause the vehicle to move backwardly or in reverse. The bearing 48 comprises a multiplicity of locking rollers, each of which may move in a cam recess on the periphery of sleeve 35. The cam recesses 49 are of sufficient arcuate length to permit each locking roller of the bearing to move a short distance around the eccentrically curved seats of the cam recesses 49 but are not of sufficient dimension axially of the sleeve 35 to permit end-wise movement of the locking rollers in the cam recesses. The active surfaces of the cam recesses 49 are curved eccentrically of the axis of the sleeve 35 and thus one portion of the active surface is closer to the axis of the sleeve than the opposed portion; the active surfaces thus present inclined curved surfaces. As shown in Fig. 14 the hub 46 may not rotate any appreciable distance in the direction indicated by the arrow without causing the sleeve 35 to rotate also. This is of course due to the locking action of the locking rollers 48 between the advanced end of cams 49 and the internal groove 47 of hub 46. As before stated, the relation of the parts in Fig. 14 is such that the vehicle will be propelled in a reverse direction when power is applied to the gear 45. The clearance between the groove 47 and the active surface of cams 49 is very slight, and a small amount of rotational movement of the hub 46 in the direction indicated by the arrow in Fig. 14 is sufficient through frictional engagement to cause the locking rollers to be rolled to the advanced end of the cams 49; the locking action is thus effected. However, if the sleeve 35 at any time should rotate in the direction indicated by the arrow in Fig. 14 at a greater speed than the hub 46, the locking action of the locking rollers will be nullified because the advanced ends of the recessed cams rotate away from the locking rollers; this action leaves the locking rollers in the receded ends of the cam recesses, and the sleeve 35 is permitted free and independent motion in the direction indicated. The latter action may be generally described by the term free wheeling and occurs when the outside wheel of the vehicle causes the sleeve 35 to rotate at a higher rate of speed than the inside wheel during a turning operation of the vehicle; it also occurs when the relative speed of rotation of the axle 34 is greater than that of the main power drive shaft.

If an attempt were made to drive the vehicle in a forward direction with the parts in position as in Fig. 14 it can readily be seen that the hub 46 would be rotated in a direction opposite to that indicated by the arrow in Fig. 14, and the frictional contact between the internal groove of the hub and the locking rollers 48 would cause said locking rollers to be rolled or forced into the receded end of the cams 49. This action would nullify any wedging effect of the locking rollers, and the hub 46 would rotate independently of the sleeve 35 due to the clearance between the receded end of the cam recesses 49 and the groove 47. No effective work can be done by driving the gear 45 in the direction opposite that of the arrow in Fig. 14 and consequently I have provided a gear 50 on sleeve 35 for driving said sleeve in such a manner that the vehicle may be caused to move forward. The gear 50 meshes with helical gear 30 and is also provided with a hub similar to hub 46 of gear 45 and has an internal groove similar to groove 47; however the angle of inclination of the groove of gear 50 with regard to the axis of sleeve 35 is opposite that of groove 47 for a purpose later to be described. Locking rollers 51 (see Figs. 4 and 5 and particularly Figs. 9 and 10) are provided on sleeve 35, and the locking rollers seat in cam recesses 52 on the periphery of sleeve 35. The active surfaces of cam recesses 52 are curved eccentrically with regard to the axis of sleeve 35 and hence present inclined active surfaces relative to hub groove, but their angle of inclination is reverse that of cam recesses 49. This fact may be seen clearly by comparing Figs. 9 and 10 with Fig. 14. Again referring to Fig. 10, it can be seen that the rotation of the hub of gear 50 in the direction indicated by the arrow in said figure through frictional contact will cause the locking rollers 51 to be rolled onto the advanced end of the cam recesses 52; a locking action similar to that above described in connection with locking rollers 48 will occur and cause the rotation of gear 50 to drive the vehicle in a forward direction. However, sleeve 35 is free to rotate in the direction indicated by the arrow in Fig. 10 at a greater rate of speed than the hub of gear 50 because the advanced end of the cam recesses 52 will move away from locking rollers 51 and said rollers may then rest in the receded end of said cam recesses where there is ample clearance to permit such independent rotation or free wheeling.

In order to permit free wheeling of sleeve 35 in a reverse direction it is necessary to provide some means for preventing the locking action of forward driving gear 50 in order to remove its hub from the locking or wedging action which would be caused by the locking rollers 51 in the cam recesses 52 when the speed of rotation in a reverse direction of the sleeve 35 exceeds that of the hub of gear 50; as before stated, the active surface of cam recesses 49 and 52 are curved eccentrically of the axis of sleeve 35, but their angles of inclination are reverse. Likewise, in order to permit free wheeling or independent rotation of sleeve 35 in a forward direction when it is being driven by gear 50 it is necessary to disconnect or set free reverse gear 45 from the locking or wedging action of locking rollers 48 upon the active surface of internal groove 47—the locking or wedging action would of course be experienced when the forward rotation of sleeve 35 exceeded that of hub 46 if the relation of the parts shown in Fig. 14 were permitted to remain without change. However, I have provided means for effecting the release of the gear 45 and preferably arrange said means for simultaneous, automatic, and cooperative operation.

As hereinbefore stated, Figs. 5, 11, and 14 illustrate the parts in position for causing axle shafts 34 and 40 to be driven in a reverse direction and free wheel in a reverse direction also. It will be noted in Figs. 3, 4, and 5 that there is a considerable amount of clearance between the inner end of hub 46 and the stationary member or vertical web 37 and also a very small amount of clearance between the hub of gear 50 and the inner face of stationary member or vertical web 38. The reason for this is that gears 45 and 50 have been shifted outwardly toward the outer end of sleeve 35 to put the parts in proper position for driving the vehicle in a reverse direction. As before stated bearing 48 has its locking rollers inclined outwardly with regard to the axis of axle 34 or to the left as shown in Fig. 4 and outwardly and to the right as shown in Fig. 5. The active surface of groove 47 is inclined in the same direction and likewise the active surface of cam recesses 49 are inclined outwardly. However, the locking rollers of bearing 51 are inclined toward the inner end of axle 34, to the right as shown in Fig. 4 and to the left as shown in Fig. 5. When gears 45 and 50 are thus shifted toward the outer end of axle 34 the internal groove 47 of hub 46 is brought into relatively close proximity to locking rollers 48 so that the rotation of hub 46 in the direction indicated by the arrow in Fig. 14 will cause a locking action of said locking rollers with sleeve 35 and drive said sleeve. At the same time gear 45 is shifted toward the outer end of the axle 34 the gear 50 is likewise shifted and a greater amount of clearance is provided between locking rollers 51 and the internal groove of the hub of gear 50. This can be seen clearly in Fig. 9, and because of the greater amount of clearance no wedging or locking action can be effected by the locking rollers 51. The speed of rotation of the sleeve 35 may thus exceed that of the hub of gear 50 and the vehicle may free wheel in a reverse direction. The means by which gears 45 and 50 are shifted outwardly toward the outer end of sleeve 35 and axle 34 will now be described and reference be had particularly to Figs. 3 and 4. A cam principle is preferably employed for accomplishing this shifting. I preferably employ a shifting disc 53 for shifting gear 45 toward the outer end of axle 34 and sleeve 35. The disc 53 is provided with an annular bore which seats rotatably on an annular axial extension of the hub of gear 45. However, I interpose a thrust bearing 54 between the inner face of gear 45 and the outer face of disc 53; the thrust bearing 54 is preferably arranged to seat partially in opposing annular grooves in said gear 45 and disc 53. A shifting of disc 53 toward the outer end of sleeve 35 of course causes the disc to bear against bearing 54 and bearing 54 in turn bears on gear 45 and tends to force it toward the outer end of sleeve 35. The rotation of gear 45 in either direction will cause through frictional engagement the rotation of shifting disc 53, and I employ this phenomenon to assist in effecting an outward shifting of the gear 45 and disc 53. I preferably employ cam means between the outer face of stationary member or vertical web 37 and the inner face of shifting disc 53 in order to utilize the wedging effect of the cam means in forcing the shifting disc 53 and gear 45 toward the outer end of the sleeve 35. For efficient operation and long wearing qualities I preferably employ rollers 55 operating in arcuate cam recesses 56 and 57. The cam recesses 56 and 57 are formed in stationary member or vertical web 37 and shifting disc 53, and the active surface of said cam recesses are actively opposed so as to provide cam surfaces upon which rollers 55 operate. When the gear 45 is rotated to cause reverse propulsion of the vehicle, or in the direction indicated by the arrow in Fig. 3, the frictional contact of the inner face of gear 45 on thrust bearing 54 and the inner face of shifting disc 53 causes the shifting disc 53 to be rotated likewise in the direction indicated by the arrow, and rollers 55 by similar frictional contact are rolled from the depressed ends of cam recesses 56 and 57 on the inclined or active cam surfaces of said recesses to the advanced ends of said recesses. As the rollers 55 move from the depressed ends toward the advanced ends the shifting disc 53 is urged outwardly toward the end of sleeve 35 by the action of rollers 55 effecting a thrust action of a movable member away from a stationary member. In order to facilitate the rapid movement of rollers 55 from the depressed ends of recesses 56 and 57 to their advanced ends by increasing the frictional contact between said cam surfaces and said rollers, I preferably interpose a coiled spring 58 between the inner face of gear 45 and the outer face of disc 53. The coil spring causes disc 53 to be pushed toward stationary member or vertical web 37 and makes the shifting action of the rollers 55 more rapid and positive. The shifting of gear 45 toward the outer end of the sleeve 35 brings the active surface of groove 47 into closer proximity to locking rollers 48 so that a wedging or locking action may establish a driving connection between gear 45 and sleeve 35; disc 60 moves toward the outer end of sleeve 35 because rotation of said disc causes roller 64 to recede to the receded ends of cam recesses 61 and 62—this shifting of disc 60 permits the thrust action of rollers 55 to effect the shifting of gear 45.

A shifting disc 60 is similar to shift disc 53 and is provided with an annular opening which seats rotatably on an annular axial extension of hub 46. A thrust bearing 59 is similar to thrust bearing 54 and is preferably arranged to operate in oppositely positioned annular grooves formed in the inner face of shift disc 60 and outer face of gear 45. The outer face of shift disc 60 is provided with a pair of diametrically oppositely arranged arcuate cam recesses 61 having their active surfaces inclined in a direction parallel to that of the cam recesses 57 and operatively opposed. A pair of arcuate cam recesses 62 are positioned on the inner face of stationary member or web 63 and roller means 64 are adapted to operate in cam recesses 61 and 62 as shown clearly in Fig. 3. Fig. 13 illustrates in detail the diametrically opposite arrangement of cam recesses 61 in shift disc 60, and each of the shifting discs has its cam recesses positioned in a like manner. The rotation of gear 45 in the direction indicated by the arrow in Fig. 3 causes disc 60 to be rotated likewise in the direction indicated by the arrow so that the receded end of recess 61 is brought into a position opposite that of the receded end of the cam recess 62 in stationary member 63; roller means 64 are thus at the deep ends of the cam recesses and cannot act to space disc 60 any appreciable distance from stationary member 63. Movement of the gear 45 in a direction opposite that indicated by the arrow in Fig. 3 would cause the advanced ends of the cam recesses 61 and 62 to be brought opposite each other, and the roller means 64 would then be rolled into the advanced ends of said cam recesses and force the shift disc 60 toward the inner end of sleeve 35 by a thrust action of a movable member opposed by a stationary member. This shifting action occurs automatically when the direction of rotation of gear 45 is reversed and would place the hub of gear 45 in such a relation to locking rollers 48 that there could be no locking action of said locking rollers between sleeve 35 and the groove 47.

On the outer face of stationary member or web 63 are arranged a pair of cam recesses 65 which are similar in all respects to cam recesses 56 in stationary member or vertical web 37. A shifting disc 68 similar in all respects to shifting disc 53 is arranged on the hub of gear 50 and roller means 66 are adapted to operate in said cam recesses 65 and 67. It can thus be seen that rotation of gear 50 in the direction indicated by the arrow in Fig. 3 causes roller means 66 to be rolled to the advanced ends of cam recesses 65 and 67 and by a thrust action push shift disc 68 toward the outer end of sleeve 35. A thrust bearing similar to thrust bearing 59 is interposed between the outer face of disc 68 and the inner face of gear 50; the thrust bearing is preferably seated in oppositely arranged annular grooves in the faces of said gear and disc.

In order to effect a more positive cooperation and interdependent movement between hub 46 and the hub of gear 50 I preferably place a slidably and rotatably mounted sleeve 69 on sleeve 35 between said hub 46 and the hub of gear 50. Thus when hub 46 is shifted outwardly it acts upon sleeve 69 to aid in shifting gear 50 outwardly; likewise when gear 50 is shifted toward the inner end of sleeve 35 the hub of said gear is pushed against sleeve 69 which in turn urges gear 45 toward the inner end of sleeve 35. (See Fig. 4.)

A shift disc 70 is similar in all respects to shift disc 53 (see Fig. 4) and is provided with a pair of diametrically oppositely arranged arcuate cam recesses 71 which are similar to cam recesses 61 shown in Figs. 3 and 13. Referring again to Fig. 3, the stationary member or vertical web 38 is provided with a pair of diametrically arranged arcuate cam recesses 72 which are similar in all respects to cam recesses 62 formed on the inner face of stationary member or vertical web 63. Roller means 73 operate in cam recesses 71 and 72 and are found at the depressed end of said recesses when the parts of the mechanism are in position to cause sleeve 35 to be rotated in a reverse direction.

The shifting of gear 50 toward the outer end of sleeve 35 creates such an amount of clearance between the groove in the hub of gear 50 that the rollers 51 cannot come into contact with the groove of the hub so as to effect any locking action. The position of the parts when gear 50 is shifted toward the outer end of sleeve 35 is clearly indicated in Fig. 9.

If the sleeve 35 rotates at a higher rate of speed in reverse direction than gear 45 the locking rollers of bearing 48 are permitted to move toward the receded or depressed ends of cam recesses 49 because the higher portions of the recesses are moving away from beneath the rollers; this fact permits the sleeve to rotate independently of the hub of the gear. No driving action of the sleeve can be had until the speed of rotation of gear 45 and sleeve 35 become substantially identical, and then the rollers of bearing 48 will be returned to the higher or shallow portions of cam recesses 49 by the frictional contact of groove 47 which rolls the locking rollers up the inclined seats of cam recesses 49. The locking or wedging action heretofore explained then ensued, and a driving connection between the sleeve and gear hub is effected. There is sufficient clearance between the locking rollers of bearing 51 and the internal groove of gear 50 when the gear is shifted toward the outer end of the sleeve; this is of course caused by the cone shaped contour of the internal groove moving away from the cone shaped contour of the cam recesses. No locking action of gear 50 by locking rollers 51 is possible while the cone shaped parts are so spaced from each other.

When the rotation of drive shaft 23 is reversed in direction from that just described and indicated by the arrow in Fig. 5 and causes gears 45 and 50 to be driven in a direction opposite from that indicated by the arrows in Fig. 3, the discs 60 and 70 will be caused to rotate in a direction opposite to that indicated by the arrows in Fig. 3, and rollers 64 and 73 will be brought or rolled to the advanced ends of cam recesses 61 and 71 of discs 60 and 70 respectively. The rollers will likewise be brought or rolled to the advanced ends of cam recesses 62 and 72 in stationary members or vertical webs 63 and 38 respectively. The ensuing thrust action caused by the described rotation of gears 45 and 50 and shift discs 60 and 70 will cause said gears 45 and 50 to be pushed toward the inner end of sleeve 35; the hub of gear 50 will then be placed in position to be locked for driving action by roller bearing 51 and gear 45 will be freed from any possible locking action by locking rollers 48. Since sliding sleeve 69 is interposed between the hub of gear 50 and the hub of gear 45 the hub of gear 50 cannot be put into position for locking engagement by rollers 51 until the hub of gear 45 is placed in position to be free from the locking action of the rollers 48. The vehicle may then be driven in a forward direction and if the speed of sleeve 35 becomes greater than that of gear 50 the sleeve may be permitted to free wheel or move independently of the hubs of gears 45 and 50 in a forward direction. As is the case with the hub of gear 50 when it is shifted outwardly, the hub of gear 45 cannot be subjected to the locking or wedging action of rollers 48 because the clearance is too great for this action when gear 45 is moved toward the inner end of sleeve 35. The shifting of the various shift discs may be speeded up by the interposition of coil springs similar to coil spring 58 between each gear face and the face of the shift disc which is in opposed relation to it.

The gears 29, 30, 45, and 50 are helical gears, and of course a lateral thrust is experienced when one of these gears drives its meshing gear. For example, and referring to Fig. 5, when gear 29 is driven in a direction so as to cause the reverse rotation of gear 45 the lateral thrust is toward the outer end of sleeve 35; this lateral thrust aids in shifting gear 45 into position to be locked to sleeve 35 by bearing 48. During this time gear 30 is rotated in the same direction as gear 29 and aids the other shifting mechanism to move gear 50 toward the outer end of gear 35. This establishes a proper clearance as before described between bearing 51 and gear 50 so that no locking action between them is possible. When the direction of rotation of gears 29 and 30 is reversed from the direction of rotation just described the thrust of gears 45 and 50 is toward the inner end of sleeve 35 and aids in placing the hub of gear 50 in position for locking action by locking rollers 51 and places the hub of gear 45 in such a relation to locking rollers 48 that no locking action can be effected by said locking rollers.

At times it is undesirable to allow the rear axle shafts to free wheel or move independently of the rotation of the motor, and this is particularly true when the vehicle is descending a hill, and the braking action of the motor is desired to be utilized for effecting a gradual descent of the vehicle. In order to accomplish such a purpose with my mechanism I have provided means under the control of the driver for causing the shifting of the various shift discs and gears. A shifting arm 74 may be formed integrally with sleeve 69, and its lower end may have secured thereto a transverse bar 75 of sufficient length to extend the entire distance between disc 53 and disc 70. (See Figs. 3, 11, and 12.) A series of vertically extending fingers 76, 77, 78, and 79 may be formed on bar 75 and be made of sufficient length to extend upwardly into the arcuate groove 80, 81, 82, and 83 on the periphery of discs 53, 60, 68, and 70 respectively. Finger 76 is shown in side elevation in Fig. 11 and is seated in its arcuate groove 80 in disc 53. The various arcuate grooves are of sufficient length to permit the free and automatic shifting of their discs, but when arm 74 is rotated in a clockwise direction from the position indicated in Fig. 11 the various discs will be rotated in a clockwise direction also. If the vehicle is being driven in a forward direction, gear 29 is being rotated in a clockwise direction (referring to Fig. 11) and has caused the shifting of gears 45 and 50 toward the inner end of sleeve 35, and when arm 74 is moved in a clockwise direction from the position indicated in Fig. 11 the various shifting discs are rotated so as to free gear 50 from any locking action of the locking rollers 51 and to put or shift gear 45 into position to be locked by the rollers of bearing 48 when the speed of sleeve 35 tends to become greater than the speed of the hub of gear 45. The bearing 48 locks the gear 45 to sleeve 35 and prevents said sleeve from rotating in a forward direction at a higher rate of speed than gear 45. Since gear 45 is under direct control of the motor the motor will provide braking action for the rear wheels of the vehicle. During the time the braking action of the motor is being utilized as just described, the vehicle may negotiate a turn without causing the inside wheel to slip. The outside wheel will not be permitted to rotate at a greater proportional rate of speed than the motor because the outside sleeve will be locked from such rotation. However, the inside wheel does not need to traverse as long a path as the outside wheel and consequently the rate of rotation of the inside sleeve will be less than that of its gears. The frictional contact between the hub of the gear and the rollers of the bearing which is causing the locking and braking action will cause the groove of the hub to carry or roll the rollers to the deep portions of the recesses in which they move. This can be seen clearly by referring to Fig. 10 and assuming that the gear 45 is rotating at a greater rate of speed in the direction indicated by the arrow than the sleeve 35 and also assuming that the vehicle is being driven in a forward direction. As soon as the turn is entirely negotiated the speed of rotation of the gear 45 and the sleeve 35 will tend to become substantially equal and the locking rollers 48 will cause a locking action to the sleeve and the gear.

The rotation of arm 74 (see Fig. 11) may be caused by the actuation of a connecting link 84 which is pivotally connected to arms 74 and link 85 (see Fig. 1 also). The link 85 protrudes from housing 20 through an opening therein and through appropriate packing material. The link 85 at its forward end (see Fig. 1) is pivotally connected to a link 86 which in turn is pivotally connected to a crank arm 87 whose lower end is keyed to a transverse shaft 88 having appropriate spaced bearings in the side frame members. A crank arm 89 is keyed to shaft 88 and has a link 90 pivotally connected thereto. The forward end of link 90 is pivotally connected to one leg of a substantially U-shaped cam member 91 whose base is pivotally mounted on a bracket 92 secured to the transmission housing 93. The other leg of member 91 extends forwardly and presents a cam surface 94 against which a foot brake operating lever 95 is adapted to impinge when depressed slightly. The depression of the brake lever 95 causes the forward end of member 95 to be forced inwardly and causes link 90 to be pulled in a forward direction. The forward movement of link 90 causes crank arms 89 to be drawn forwardly and 87 backwardly and push link connections 86, 85, and 84 in a rearward direction from the position indicated in Figs. 1, 2, and 11. The rotation of shifting arm 74 results in the rotation of the various shift discs which in turn cause the gears 45 and 50 to be shifted toward the outer end of sleeve 35 if the vehicle is in forward motion. A very slight depression of the brake lever 95 is sufficient to cause the movement of U-shaped cam member 91 and further movement of the brake lever 95 causes said lever to leave said cam surface 94 and advance on the surface 96 without causing any movement of member 91. It can be seen that the braking system of the vehicle is not interfered with since the movement of the member 91 may be effected by the lost motion movement of the brake lever. A tension spring 97 is connected to the forward end of member 91 and pulls said forward end away from the transmission when the brake lever is released. A tension spring 98 has one end secured to a lug 99 on the forward side of arm 74 (see Fig. 11) and the other end secured to a rod 100 which is anchored in stationary member or vertical web 63. The release of the brake lever enables spring 98 to pull arm 74 from its rearward position as shown in Fig. 11 to the forward position.

Axle shaft 40 and drive sleeve 41 are driven and controlled in their movements by an arrangement of parts analogous to those parts which drive and control axle shaft 34 and sleeve 35. However, it is to be noted that the forward and reverse gears are shifted toward the outer end of sleeve 41 and to the left as shown in Fig. 5 for reverse driving instead of to the right as is the case with the forward and reverse gears 50 and 45 respectively. The arrangement is analogous, however, in that the sets of gears on each sleeve are shifted toward the outer ends of said sleeves for reverse motion and are shifted toward the inner ends of said sleeves for forward motion. A shift arm 101 operates and is constructed in a manner similar to shift arm 74 and has similar connections with the shaft 88. When the brake lever 95 is depressed both of the shifting arms 74 and 101 are driven rearwardly.

A modified form of driving sleeve is illustrated in Figs. 8, 15, and 16, and a modified form of locking or wedging bearing is shown in Figs. 15 and 16. The modified sleeve 102 is provided with a series of recesses 103 arranged around its periphery. The active surfaces of said cam recesses are inclined in the same manner as the cam recesses 52 explained in connection with sleeve 35. Another set of cam recesses 104 is arranged around the periphery of sleeve 102 and is similar in construction and angle of inclination to cam recesses 49 of sleeve 35. (See Fig. 8.) Peripheral grooves 105 extend around sleeve 102 and form seats for annular springs 106; the grooves 105 are so spaced as to intersect the cam recesses 103 adjacent their ends. A pair of similar grooves 107 are arranged to intersect the recesses 104 adjacent their ends and likewise provide seats for annular springs similar to springs 106. The locking bearing 108 is provided with locking rollers having peripheral grooves or reduced portions adjacent their ends and springs 106 are adapted to seat in said peripheral grooves or reduced portions. The springs 106 tend to retain the rollers of the bearing 108 in the deep portions of recesses 103 when the rollers are not making a driving contact with the internal groove of a gear. The springs 106 also tend to force the rollers toward the axis of the sleeve and since the eccentrically curved and inclined active surfaces of the bottoms of cam recesses 103 offer less resistance to the movement of the rollers they will come to rest in or close to the deepest portions of the recesses. Springs 106 also hold locking rollers in orderly position.

It is of course understood that the clearance between the various bearings, such as bearings 48 and 51, and the internal grooves upon which they operate is exaggerated in the drawings so that the operation may be more easily perceived. As a matter of fact, the clearance is so slight in the actual device that it is not possible to illustrate it accurately in these drawings. Likewise, the angle of inclination of the arcuate cam recesses in the various shifting discs and stationary members or vertical webs is greatly exaggerated for the same reason.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. Driving mechanism comprising a power shaft, a gear mounted on said power shaft, a rotatable secondary power transmission shaft, a gear for driving said secondary power transmission shaft and adapted to be driven by the gear on said power shaft, means for establishing a uni-directional driving connection between said secondary power transmission shaft and the gear for driving the same, and means operating on a cam principle and from a stationary member for effecting relative sliding movement between said means for establishing a driving connection and the gear for driving said secondary power transmission shaft, said means operating on a cam principle being adapted to be actuated by the positive rotation of the gear for driving said secondary power transmission shaft.

2. Driving mechanism comprising a power shaft, a gear mounted on said power shaft, a rotatable secondary power transmission shaft, a gear for driving said secondary power transmission shaft and adapted to be driven by the gear on said power shaft, means for establishing a uni-directional driving connection between said secondary power transmission shaft and the gear for driving the same, and means operating on a cam principle and from a stationary member for freeing said secondary power transmission shaft from any possible driving connection with the gear for driving said secondary power transmission shaft, said last mentioned means being actuated by the reverse rotation of the gear for driving said secondary power transmission shaft.

3. Driving mechanism comprising a power shaft, a helical gear mounted on said power shaft, a rotatable secondary power transmission shaft, a helical gear for driving said secondary power transmission shaft and in constant mesh with the gear mounted on said power shaft, said gear for driving said secondary power transmission shaft being slidable relative to the axis of said secondary power transmission shaft, locking roller means for establishing a driving connection between said secondary power transmission shaft and the gear for driving the same, and shifting means operating on a cam principle and from a stationary member for sliding said gear for driving said secondary power transmission shaft into and out of position to be engaged by said roller means.

4. Driving mechanism comprising a power shaft, a helical gear mounted on said power shaft, a rotatable secondary power transmission shaft, a helical gear for driving said secondary power transmission shaft and in constant mesh with the gear mounted on said power shaft, said gear for driving said secondary power transmission shaft being slidable relative to the axis of said secondary power transmission shaft, locking roller means for establishing a driving connection between said secondary power transmission shaft and the gear for driving the same, and shifting means operating on a cam principle and from a stationary member for sliding said gear for driving said secondary power transmission shaft into and out of position to be engaged by said roller means, the teeth on said helical gears being so arranged and inclined that the normal lateral thrust is operative to urge the gear for driving said secondary power transmission shaft toward one end of said secondary power transmission shaft during rotation in one direction and toward the other end during rotation in the opposite direction.

5. Driving mechanism comprising a power shaft, a helical gear mounted on said power shaft, a rotatable secondary power transmission shaft, a helical gear for driving said secondary power transmission shaft and in constant mesh with the gear mounted on said power shaft, said gear for driving said secondary power transmission shaft being slidable relative to the axis of said secondary power transmission shaft, locking roller means for establishing a driving connection between said secondary power transmission shaft and the gear for driving the same, and shifting means operating on a cam principle and from a stationary member for sliding said gear for driving said secondary power transmission shaft into and out of position to be engaged by said roller means, said shifting means comprising shifting discs arranged on opposite sides of said gear for driving said secondary power transmission shaft and between a pair of stationary members, oppositely arranged cam recesses in the opposite faces of said discs, and roller means operating between said discs and said stationary members in said cam recesses.

6. Driving mechanism comprising a power shaft, a helical gear mounted on said power shaft, a rotatable secondary power transmission shaft, a helical gear for driving said secondary power transmission shaft and in constant mesh with the gear mounted on said power shaft, said gear for driving said secondary power transmission shaft being slidable relative to the axis of said secondary power transmission shaft, locking roller means for establishing a driving connection between said secondary power transmission shaft and the gear for driving the same, and shifting means operating on a cam principle and from a stationary member for sliding said gear for driving said secondary power transmission shaft into and out of position to be engaged by said roller means, said shifting means comprising shifting discs arranged on opposite sides of said gear for driving said secondary power transmission shaft and between a pair of stationary members, oppositely arranged cam recesses in the opposite faces of said discs, roller means operating between said discs and said stationary members and in said cam recesses, arcuate recesses on the periphery of each of said shifting discs, a finger operating in each of said arcuate recesses, and manually operable link connections with said fingers for causing said fingers to move in said arcuate recesses and rotate said shifting discs.

7. Driving mechanism comprising a power shaft, a helical gear mounted on said power shaft, a rotatable secondary power transmission shaft, a helical gear for driving said secondary power transmission shaft and in constant mesh with the gear mounted on said power shaft, said gear for driving said secondary power transmission shaft being slidable relative to the axis of said secondry power transmission shaft, locking roller means for establishing a driving connection between said secondary power transmission shaft and the gear for driving the same, and shifting means operating on a cam principle and from a stationary member for sliding said gear for driving said secondary power transmission shaft into and out of position to be engaged by said roller means, said shifting means comprising shifting discs arranged on opposite sides of said gear for driving said secondary power transmission shaft and between a pair of stationary members, oppositely arranged cam recesses in the opposite faces of said discs, roller means operating between said discs and said stationary members and in said cam recesses, and anti-friction means interposed between the faces of said gear and said shifting discs.

8. Driving mechanism comprising a power shaft, a helical gear mounted on said power shaft, a rotatable secondary power transmission shaft, a helical gear for driving said secondary power transmission shaft and in constant mesh with the gear mounted on said power shaft, said gear for driving said secondary power transmission shaft being slidable relative to the axis of said secondary power transmission shaft, locking roller means for establishing a driving connection between said secondary power transmission shaft and the gear for driving the same, and shifting means operating on a cam principle and from a stationary member for sliding said gear for driving said secondary power transmission shaft into and out of position to be engaged by said roller means, said shifting means comprising shifting discs arranged on opposite sides of said gear for driving said secondary power transmission shaft and between a pair of stationary members, oppositely arranged cam recesses in the opposite faces of said discs, roller means operating between said discs and said stationary members and in said cam recesses, and spring means interposed between said gear for driving said secondary power transmission shaft and said discs for urging said dics away from said gear an into closer proximity to said stationary members.

9. Driving mechanism comprising a power shaft, a helical gear mounted on said power shaft, a rotatable secondary power transmission shaft, a helical gear for driving said secondary power transmission shaft and in constant mesh with the gear mounted on said power shaft, said gear for driving said secondary power transmission shaft being slidable relative to the axis of said secondary power transmission shaft, locking roller means for establishing a driving connection between said secondary power transmission shaft and the gear for driving the same, and shifting means operating on a cam principle and from a stationary member for sliding said gear for driving said secondary power transmission shaft into and out of position to be engaged by said roller means, said shifting means comprising shifting discs arranged on opposite sides of said gear for driving said secondary power transmission shaft and between a pair of stationary members, oppositely arranged cam recesses in the opposite faces of said discs, roller means operating between said discs and said stationary members and in said cam recesses, and spring means interposed between said gear for driving said secondary power transmission shaft and said discs for urging said discs away from said gear and into closer proximity to said stationary members, and antifriction means also interposed between the faces of said gear and said shifting discs.

10. Driving mechanism comprising a power shaft, a pair of gears mounted on and keyed thereto, a rotatable secondary power transmission shaft, a pair of gears in constant mesh with said gears on said power shaft and for driving said secondary power transmission shaft, means for establishing a uni-directional driving connection between said secondary power transmission shaft and one of said gears for driving the same, means for establishing a uni-directional and opposite driving connection between said secondary power transmission shaft and the other of said gears for driving the same, and shifting means operating on a cam principle and from stationary members for shifting said gears in one direction when they are rotated in one direction and for shifting said gears in the opposite direction when said gears are rotated in the opposite direction, said shifting in one direction being adapted to place one gear in position for engagement by said driving connection establishing means and to free the other of said gears from any possible engagement by the other of said driving connection establishing means.

11. Driving mechanism comprising a power shaft, two pairs of gears mounted on and keyed thereto, a pair of rotatable secondary power transmission shafts, two pairs of gears in constant mesh with said gears on said power shaft and for driving said secondary power transmission shafts in either direction, means for establishing uni-directional driving connections between said secondary power transmission shafts and two of said gears for driving the same, means for establishing uni-directional and opposite driving connections between said secondary power transmission shafts and the other of said gears for driving the same, and shifting means operating on a cam principle and from stationary members for shifting said gears for driving said secondary power transmission shafts in one direction when they are rotated in one direction and for shifting said gears in the opposite direction when said gears are rotated in the opposite direction, said shifting in one direction being adapted to place one pair of gears in position for engagement by said driving connection establishing means and to free the other pair of said gears from any possible engagement by the other of said driving connection establishing means.

12. Driving mechanism comprising a power shaft, two pairs of gears mounted on and keyed thereto, a pair of rotatable axle shafts, two pairs of gears in constant mesh with said gears on said power shaft and for driving said axle shafts in either direction, means for establishing uni-directional driving connections between said axle shafts and two of said gears for driving the same, means for establishing uni-directional and opposite driving connections between said axle shafts and the other of said gears for driving the same, and shifting means operating on a cam principle and from stationary members for shifting said gears for driving said axle shafts in one direction when they are rotated in one direction and for shifting said gears in the opposite direction when said gears are rotated in the opposite direction, said shifting in one direction being adapted to place one pair of gears in position for engagement by said driving connection establishing means and to free the other pair of said gears from any possible engagement by the other of said driving connection establishing means, said shifting means comprising a pair of shifting discs arranged on each side of said gears for driving said axle shafts and between a pair of stationary members, cam surfaces carried by the outer faces of said discs and the inner faces of said stationary members, and roller means arranged to operate on said cam surfaces.

13. Driving mechanism comprising a power shaft, a gear mounted on said power shaft, a rotatable axle shaft, a sleeve splined to said axle shaft, a series of cam recesses formed in the periphery of said sleeve, said recesses being inclined axially of said sleeve and having their seats curved eccentrically of said sleeve, a cone shaped roller bearing arranged on said sleeve and having each of its rollers seating in one of said cam recesses, a gear having an enlarged hub with an axial, cone shaped bore therein, and means for shifting said gear axially of said sleeve so as to place the wall of the cone shaped bore of said hub in position to be in contact with the rollers of said bearing so that rotation of said gear will roll said rollers up the curved seats of said cam recesses and effect a locking engagement between said sleeve and said gear.

14. Driving mechanism comprising a power shaft, a gear mounted on said power shaft, a rotatable axle shaft, a sleeve splined to said axle shaft, a series of cam recesses formed in the periphery of said sleeve, said recesses being inclined axially of said sleeve and having their seats curved eccentrically of said sleeve, a cone shaped roller bearing arranged on said sleeve and having each of its rollers seating in one of said cam recesses, a gear having an enlarged hub with an axial, cone shaped bore therein, and means for shifting said gear axially of said sleeve so as to place the wall of the cone shaped bore of said hub in position to be in contact with the rollers of said bearing so that rotation of said gear will roll said rollers up the curved seats of said cam recesses and effect a locking engagement between said sleeve and said gear, said shifting means comprising a pair of stationary members arranged on opposite faces of said gear, a shifting disc arranged between each gear face and stationary member, a cam surface carried by the outer face of each of said discs, and roller means arranged between the outer face of each disc and the inner face of each stationary member and adapted to operate on said cam surfaces so as to cause axial movement of said gear relative to said sleeve when said gear is rotated.

15. Driving mechanism comprising a power shaft, a gear mounted on said power shaft, a rotatable axle shaft, a sleeve splined to said axle shaft, a series of cam recesses formed in the periphery of said sleeve, said recesses being inclined axially of said sleeve and having their seats curved eccentrically of said sleeve, a cone shaped roller bearing arranged on said sleeve and having each of its rollers seating in one of said cam recesses, a gear having an enlarged hub with an axial, cone shaped bore therein, means for shifting said gear axially of said sleeve so as to place the wall of the cone shaped bore of said hub in position to be in contact with the rollers of said bearing so that rotation of said gear will roll said rollers up the curved seats of said cam recesses and effect a locking engagement between said sleeve and said gear, said shifting means comprising a pair of stationary members arranged on opposite faces of said gear, a shifting disc arranged between each gear face and stationary member, a cam surface carried by the outer face of each of said discs, and roller means arranged between the outer face of each disc and the inner face of each stationary member and adapted to operate on said cam surfaces so as to cause axial movement of said gear relative to said sleeve when said gear is rotated, and spring means interposed between the outer faces of said gear and the inner faces of said shifting discs for urging said shifting discs toward said stationary members.

16. Driving mechanism comprising a power shaft, a plurality of helical gears mounted on said power shaft, a pair of rotatable axle shafts, a sleeve splined to each of said axle shafts, a series of cam recesses formed in the periphery of each of said sleeves, said recesses being inclined axially of said sleeves and having their seats curved eccentrically of said sleeves, a cone shaped roller bearing arranged on each of said sleeves and having each of its rollers seating in one of said cam recesses; a helical gear on each of said sleeves having an enlarged hub with an axial cone shaped bore therein, means for shifting each of said helical gears axially of said sleeves so as to place the wall of each of said cone shaped bores of said hubs in position to be in contact with the rollers of said bearing so that rotation of each of said helical gears will roll said rollers up the curved seats of said cam recesses and effect a locking engagement between said sleeves and said helical gears, said shifting means comprising a pair of stationary members arranged on opposite faces of said helical gears, a shifting disc arranged between each helical gear face and each stationary member, a cam surface carried by the outer face of each of said discs, and roller means arranged between the outer faces of said discs and the inner face of said stationary members and adapted to operate on said cam surfaces so as to cause axial movement of said helical gears relative to said sleeve when said helical gears are rotated and spring means interposed between the faces of said helical gears and the inner faces of said shifting discs for urging said shifting discs toward said stationary members.

17. Driving mechanism comprising a power shaft, a gear mounted on said power shaft, a rotatable axle shaft, a sleeve splined to said axle shaft, a series of cam recesses formed in the periphery of said sleeve, said recesses being inclined axially of said sleeve and having their seats curved eccentrically of said sleeve, a cone shaped roller bearing arranged on said sleeve and having each of its rollers seating in one of said cam recesses, a gear having an enlarged hub with an axial, cone shaped bore therein, means for shifting said gear axially of said sleeve so as to place the wall of the cone shaped bore of said hub in position to be in contact with the rollers of said bearing so that rotation of said gear will roll said rollers up the curved seats of said cam recesses and effect a locking engagement between said sleeve and said gear, said shifting means comprising a pair of stationary members arranged on opposite faces of said gear, a shifting disc arranged between each gear face and stationary member, a cam surface carried by the outer face of each of said discs, and roller means arranged between the outer face of each disc and the inner face of each stationary member and adapted to operate on said cam surfaces so as to cause axial movement of said gear relative to said sleeve when said gear is rotated, spring means interposed between the outer faces of said gear and the inner faces of said shifting discs for urging said shifting discs toward said stationary members, and thrust bearings interposed between the faces of said helical gears and the inner faces of said shifting discs.

18. Driving mechanism comprising a power shaft, two pairs of gears mounted on and keyed thereto, a pair of rotatable secondary power transmission shafts, two pairs of gears in constant mesh with said gears on said power shaft and for driving said secondary power transmission shafts in either direction, means for establishing uni-directional driving connections between said secondary power transmission shafts and two of said gears for driving the same, means for establishing uni-directional and opposite driving connections between said secondary power transmission shafts and the other of said gears for driving the same, shifting means operating on a cam principle and from stationary members for shifting said gears for driving said secondary power transmission shafts in one direction when they are rotated in one direction and for shifting said gears in the opposite direction when said gears are rotated in the opposite direction, said shifting in one direction being adapted to place one pair of gears in position for engagement by said driving connection establishing means and to free the other pair of said gears from any possible engagement by the other of said driving connection establishing means, and means for causing the manual actuation of said shifting means.

19. Driving mechanism comprising a power shaft, a plurality of gears mounted on said power shaft, a pair of rotatable axle shafts, a sleeve splined to each of said axle shafts, a series of cam recesses formed in the periphery of said sleeves and having their seats curved eccentrically of said sleeves, a cone shaped roller bearing arranged on each of said sleeves and having each of its rollers seating in one of said cam recesses, a gear on each of said sleeves and having an enlarged hub with an axial cone shaped bore therein, and means for shifting said gears axially of said sleeves so as to place the walls of said cone shaped bores of said hubs in position to be in contact with the rollers of said bearing so that rotation of said gears will roll said rollers up the curved seats of said cam recesses and effect a locking engagement between said sleeves and said gears.

20. Power transmitting mechanism comprising a common power drive shaft, a secondary power transmitting shaft, a gear concentrically rotatable about secondary power transmitting shaft and in mesh with a gear concentrically mounted on the common power drive shaft, cam operative locking rollers interposed between secondary power transmitting shaft and said gear concentrically rotatable about same and adapted to establish uni-directional driving connection between same, and means for increasing the spacing of the entire opposing active surfaces of said cams rendering locking rollers inoperative in establishing driving connection between secondary power transmitting shaft and gear concentrically rotatable about same in either direction of rotation, and means for decreasing the spacing of the entire opposing active surfaces of said cams rendering locking rollers operative in establishing uni-directional driving connection between secondary power transmitting shaft and gear concentrically rotatable about same.

21. Power transmitting mechanism comprising a common power drive shaft, a secondary power transmitting shaft, a gear concentrically rotatable about secondary power transmitting shaft and in mesh with a gear concentrically mounted on the common power drive shaft, cam operative locking rollers for establishing uni-directional driving connection between said secondary power transmitting shaft and said gear concentrically rotatable about same, a gear concentrically rotatable about said secondary power transmitting shaft and in mesh with a gear concentrically mounted on the common power drive shaft and cam operative locking rollers for the establishing uni-directional driving connection between secondary power transmitting shaft and gear concentrically rotatable about same but whose driving connection is established uni-directional and operative in the opposite direction of rotation from that of the first mentioned uni-directional driving connection, operative means for increasing the spacing of the entire active opposing surfaces of the said cams so that either one of the two uni-directional driving connections above mentioned may be made inoperative, and mechanism establishing such relation between the two uni-directional driving connections that when one is uni-directionally operative the other is inoperative in either direction of rotation.

22. Power transmitting mechanism comprising a common power drive shaft, two secondary power transmitting shafts, a gear concentrically rotatable about each of the two secondary power transmitting shafts and meshed and geared to the common power drive shaft, cam operative locking rollers for establishing uni-directional driving connection between the two secondary power transmitting shafts and the gears concentrically rotatable about each respectively, a gear concentrically rotatable about each of the two secondary power transmitting shafts and meshed and geared to the aforesaid common power drive shaft, cam operative locking rollers for establishing uni-directional driving connection between said secondary power transmitting shafts said gears concentrically rotatable about same but whose driving connection is established uni-directional and operative in the opposite direction of rotation from that of the first mentioned uni-directional driving connections, operative means for increasing the spacing of the entire opposing active surfaces of the said cams of one of said uni-directional driving connections on each of the two secondary power transmitting shafts rendering locking inoperative for either direction of rotation and simultaneously decreasing the spacing of the entire opposing active surfaces of said cams of the other two locking driving connections uni-directionally operative in the opposite direction of rotation on each of the two secondary power transmitting shafts, so that the latter is uni-directionally operative.

23. Power transmitting mechanism comprising a common power drive shaft, two secondary power transmitting shafts, a gear concentrically rotatable about each of the two secondary power transmitting shafts and geared to the common power drive shaft, cam operative locking roller bearings for establishing uni-directional driving connection between the two secondary power transmitting shafts and the concentric gear rotatable about each respectively and also a gear concentrically rotatable about each of the two secondary power transmitting shafts and geared to the aforesaid common power drive shaft and cam operative locking roller bearings for establishing uni-directional driving connection between the two secondary power transmitting shafts and the gear rotatable about each respectively but whose driving connection is established and operative in the opposite direction of rotation from that of the first mentioned uni-directional driving connections, helical meshing introduced between the common power drive shaft and the two secondary power transmitting shafts which helical meshing transmits power for the rotation of secondary power transmitting shafts and also supplies thrust longitudinal of said secondary power transmitting shafts for the purpose of shifting the gears rotatable on the secondary power transmitting shafts which operation increases the spacing of the entire opposing active surfaces of the aforesaid cams of one of said uni-directional driving connections on each of the two secondary power transmitting shafts thereby rendering locking inoperative for either direction of rotation and simultaneously decreasing the spacing of the entire opposing active surfaces of said cams of the other two locking driving connections uni-directionally operative in the opposite direction of rotation on each of the two power transmitting shafts so that the latter is uni-directionally operative.

ALLEN L. BARNES.